(12) United States Patent
Arbesman et al.

(10) Patent No.: US 8,752,679 B2
(45) Date of Patent: Jun. 17, 2014

(54) MODULAR BRAKE PAD

(76) Inventors: Ray Arbesman, Toronto (CA); Nghi Pham, Concord (CA); Stewart Kahn, Dollard-des-Ormeaux (CA)

(*) Notice: Subject to any disclaimer, the term of this patent is extended or adjusted under 35 U.S.C. 154(b) by 274 days.

(21) Appl. No.: 13/139,264

(22) PCT Filed: Oct. 6, 2009

(86) PCT No.: PCT/CA2009/001408
§ 371 (c)(1),
(2), (4) Date: Oct. 21, 2011

(87) PCT Pub. No.: WO2010/066021
PCT Pub. Date: Jun. 17, 2010

(65) Prior Publication Data
US 2012/0031718 A1 Feb. 9, 2012

Related U.S. Application Data

(60) Provisional application No. 61/121,995, filed on Dec. 12, 2008.

(51) Int. Cl.
*F16D 69/00* (2006.01)
(52) U.S. Cl.
USPC .................................. 188/250 B; 188/250 G
(58) Field of Classification Search
USPC ......... 188/251 R, 73.35, 73.36, 73.37, 250 B, 188/250 G; D12/180
See application file for complete search history.

(56) References Cited

U.S. PATENT DOCUMENTS

| | | | |
|---|---|---|---|
| 455,033 A | 6/1891 | Criswell | |
| 1,927,012 A | 9/1933 | Blume | |
| 2,541,979 A | 2/1951 | Amundsen | |
| 2,767,817 A | 10/1956 | Davis | |
| 3,064,769 A * | 11/1962 | Billmeyer | 188/234 |
| 3,467,229 A * | 9/1969 | Deibel | 188/245 |
| 3,647,033 A * | 3/1972 | Klein | 188/251 R |
| 3,746,139 A * | 7/1973 | Bok et al. | 192/107 R |
| 3,759,354 A | 9/1973 | Dowell et al. | |

(Continued)

FOREIGN PATENT DOCUMENTS

| | | |
|---|---|---|
| FR | 1394819 A | 4/1965 |
| FR | 2127867 A5 | 10/1972 |

(Continued)

OTHER PUBLICATIONS

PCT International Search Report dated Dec. 10, 2009 for International Application No. PCT/CA2009/001408.

*Primary Examiner* — Thomas J Williams
*Assistant Examiner* — Mariano Sy
(74) *Attorney, Agent, or Firm* — Patterson & Sheridan, LLP

(57) ABSTRACT

A modular brake pad is provided. The pad is made up of a brake backing plate and at least one pre-molded friction element. The friction element is releasably attached to the backing plate using an arrangement of guide rails. The friction element may also be locked to the plate by means of a releasable locking pin that extends through the plate into the friction element. An optional intermediary shim portion can also be provided on the friction element.

26 Claims, 15 Drawing Sheets

(56) References Cited

U.S. PATENT DOCUMENTS

| | | | |
|---|---|---|---|
| 4,350,231 A * | 9/1982 | Crossman et al. | 188/218 XL |
| 5,119,909 A * | 6/1992 | Shim | 188/245 |
| 5,261,512 A * | 11/1993 | Young | 188/250 B |
| 5,469,942 A * | 11/1995 | Krumm, Sr. | 188/250 G |
| 5,509,508 A * | 4/1996 | Evans | 188/73.38 |
| 5,842,546 A * | 12/1998 | Biswas | 188/73.37 |
| 5,941,349 A * | 8/1999 | Krumm, Sr. | 188/250 G |
| 6,983,831 B2 * | 1/2006 | Beri | 188/250 B |
| 7,926,627 B2 * | 4/2011 | Wake et al. | 188/73.37 |
| 8,261,890 B2 * | 9/2012 | Paynter et al. | 188/250 B |

FOREIGN PATENT DOCUMENTS

| | | |
|---|---|---|
| GB | 1018556 A | 1/1966 |
| GB | 1485701 A1 | 9/1977 |
| GB | 2064688 A | 6/1981 |
| GB | 2151729 A | 7/1985 |
| JP | 5434946 | 8/1952 |
| JP | 5538014 | 9/1953 |
| JP | 57171439 | 4/1956 |
| JP | 61204034 | 12/1986 |
| JP | 732240 | 6/1995 |
| JP | 11210792 | 8/1999 |

* cited by examiner

MODULAR BRAKE PAD

FIELD OF THE INVENTION

The invention relates to automotive brakes, and more particularly relates to brake pads for disc brake systems.

BACKGROUND OF THE INVENTION

The number of motor vehicles has increased greatly in recent years. There is an interest in methods of reducing the cost of manufacturing brakes and replacement parts on the part of both motor vehicle manufacturers and suppliers of parts for brakes. This increased use has also led to a significant increase in the after-market for brake replacement and repair. Brakes are also in increasing demand for motor vehicles such as airplanes, trains, bicycles, all terrain vehicles and motorcycles.

Brake pads, as currently manufactured, combine two main parts, namely a plate (often called a backing plate) and a friction pad. The brake pad is mounted in a brake assembly. The backing plate may be formed with a variety of bosses, holes, or other features for receiving and retaining the friction pad. The need to use high speed low cost manufacturing methods often results in irregularities in the plate which may lead to difficulties in attaching and/or retaining the friction pad on the plate during braking, when the friction pad is in contact with the rapidly turning brake rotor, or even during the pre-installation handling of the brake pad assembly.

There are a variety of known ways of attaching a friction pad to a plate. One such way is to attach the friction pad to the backing plate using rivets. One disadvantage of the riveting process is that it creates a rigid bond between the plate and the friction pad, which can, as a result of a sudden impact, lead to breaking of the friction pad. Furthermore, this process often requires one or more additional manufacturing steps with a consequent increase in cost. In addition, when the friction pad is worn down over time, the rivets become exposed and rub against the brake rotor, causing scoring on the rotor which is costly to repair.

Another, more recently developed method of mounting the friction pad on the plate is to use a pressurised molding process to mold the friction pad directly onto the plate. In this process, the friction pad may be prepared by blending the components of the friction pad into a pre-form or cake. A conventional pressurized molding system is used to mold the friction pad pre-form onto the plate. A layer of cement or glue is often applied to the contact surface of the plate to improve the adhesion between the plate and the friction pad.

As pressure is applied to the mold assembly, the pre-form becomes heated and begins to flow, filling the mold and covering the appropriate surface of the plate. In this process, the pre-form material is intended to flow into and around the various features to improve the bond between the plate and the friction pad.

The plate is subjected to a number of forces, such as the jarring of the moving vehicle, as well as vibration caused by the rotor and noise. The problem with the prior art processes and plates is that features, such as holes and bosses, stamped into the plate often provided insufficient shear and/or tensile strength in the bond between the friction pad and plate. When additional features are stamped into the plate to increase bond strength, additional manufacturing steps are required, adding to the cost.

The most common prior art features stamped into plates are circular holes. These holes often provide unsatisfactory results because, during the molding process, the pre-form cake does not completely fill all of the holes, which in turn, leads to deficient bonding between the plate and the pre-form. The incomplete hole fills can are clearly visible, and often raise quality concerns when inspected by buyers. The incomplete hole fills also have an aesthetically displeasing appearance, which can also make them less attractive to customers. Accordingly, it has become common practice in prior art plates to fill the incomplete hole fills with putty and to paint over them, to both hide the unsatisfactory molding results and to improve appearance. These additional manufacturing steps have the added disadvantage of increasing the cost of manufacturing the disc brake.

Another concern that has become more pressing in the brake pad industry is the need for conservation, particularly of steel supplies, which have become more valuable. Brake backing plates, typically made of steel, are relatively durable and long-lasting, although the friction material attached to them is consumable. In the past, steel has been readily and cheaply available, and brake pads have been treated as a replaceable commodity (the entire unit being scrapped when the friction material is worn down). It would be desirable to preserve the backing plate portion for re-use (or re-cycling). It would be desirable to provide a modular brake pad that allows for installation and removal of replaceable friction elements, while ensuring a secure attachment with the backing plate.

SUMMARY OF THE INVENTION

According to a first aspect of the invention, a modular brake pad is provided. The pad has a brake backing plate (which has a friction surface and an opposing piston surface). At least one pair of raised guide rails is disposed on the friction surface. The pad also has at least one pre-molded friction element (which has a pair of opposing side edges). The edges are tapered for releasable engagement with the at least one pair of raised guide rails on the plate. In one embodiment, a locking pin extends through a bore in the plate and into a corresponding bore in the friction element to releasably lock the friction element to the plate. The friction element is removable from the plate by slideably disengaging the friction element from the guide rails. If locking pins are provided, these can be retracted to unlock the friction element from the plate before removal.

Preferably, the opposing side edges of the friction element are not parallel to each other. The friction element may have a trapezoidal shape, or any shape in which preferably the opposing side edges are disposed at an angle to each other.

The friction element may include an optional shim portion in addition to the friction material portion. The shim portion is releasably connected with the at least one pair of raised guide rails on the plate. The shim portion and friction material portion may be permanently connected to each other, or they may be separable.

Preferably, the shim portion is shaped to wrap around the friction material portion extending partway up the sides of the friction material portion. The upwardly extending side flanges on the shim portion may extend high enough (relative to the friction material) to serve as wear sensors.

Various configurations of the modular brake pad are possible. In one configuration, the pad has exactly two friction elements.

Preferably, the friction elements are different shapes on the right and left. They may be mirror image shapes of each other.

The friction elements may each have their own paired sets of guide rails. Alternatively, in one preferred embodiment, the plate has exactly three sets of guide rails, including a central guide rail(s) that holds both friction elements, and two outer guide rails that each grip a side edge of one of the friction elements.

Preferably, the at least one friction element is disengageable from the plate by sliding the friction element to disengage the side edges of the friction element from the guide rails.

Each guide rail may comprise a central post extending out from the plate and at least one overhanging lip extending out from the central post. The guide rails (particularly the central guide rails) may have two overhanging lips extending out left and right sides.

The guide rails may be integral with the plate, or may be separate pieces connected with the plate. In one embodiment, the guide rails are punched out from the plate.

Various configurations of locking pins are possible. Preferably, each locking pin has a conically shaped end for engaging the friction element. The locking pin can preferably be retracted by forcing a tool into the bore of the friction material to push the locking pin out through the piston side of the plate. Preferably, the locking pin is re-usable after retraction.

The backing plate may be made of any suitable hard material (especially metal or metal composite). In one possible embodiment, the backing plate is a steel backing plate.

Preferably, the piston surface of the plate is substantially flat (when the locking pin is in place if used). Preferably, the backing plate is substantially solid (i.e. having no holes apart from the bore for the locking pin). If no locking pin is used, the plate is preferably completely solid (having no holes whatsoever).

DETAILED DESCRIPTION

Figure 1:
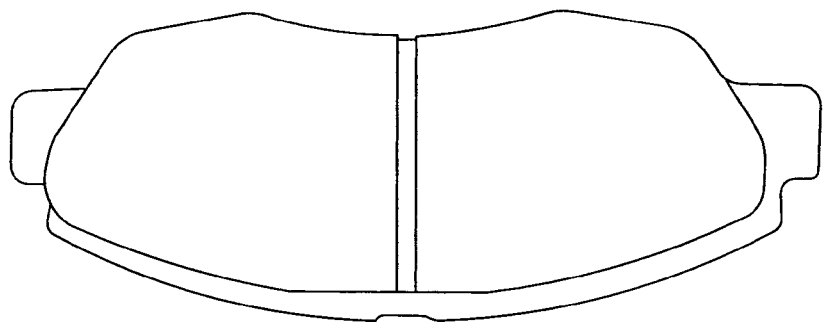
FIGS. 1, 2 and 3 show prior art brake pads for disc brake systems.
Figure 2:
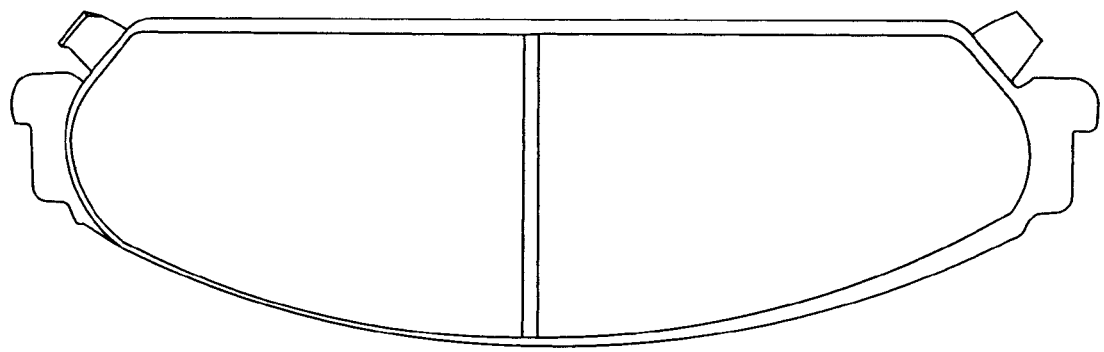
Figure 3:
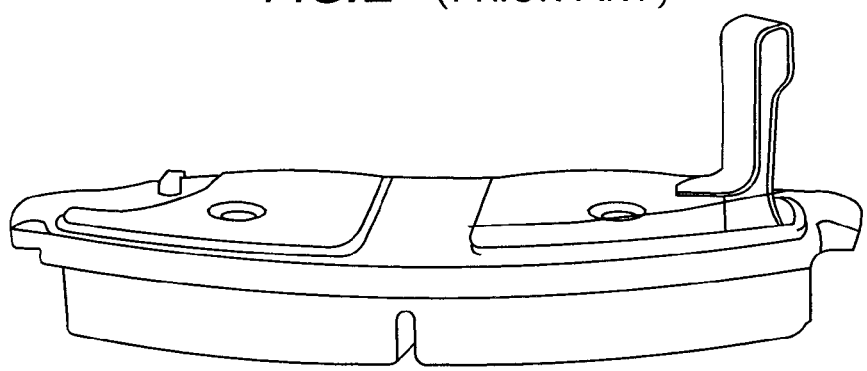

Brake pads for disc brake systems take the form of a two-piece assembly. The brake pads have a backing plate (a generally flat piece of thick metal) that is attached with a friction material (usually a metallic or ceramic composite). The friction material may be bonded or affixed to the backing plate in various ways. Prior art brake pads have been manufactured for permanent attachment between the friction material and the backing plate. Several examples of such brake pads are shown in FIGS. 1-3.

In the present modular brake pad, the friction material and backing plate are intended to be separable from each other (i.e. not permanently attached). This permits worn friction material elements to be swapped out for fresh friction material elements without the need to scrap the backing plate. Further, the modularity allows the brake pad to be customized—for example, to upgrade standard friction elements to a higher-performance category (e.g. for better thermal management, or noise reduction).

Figure 4:
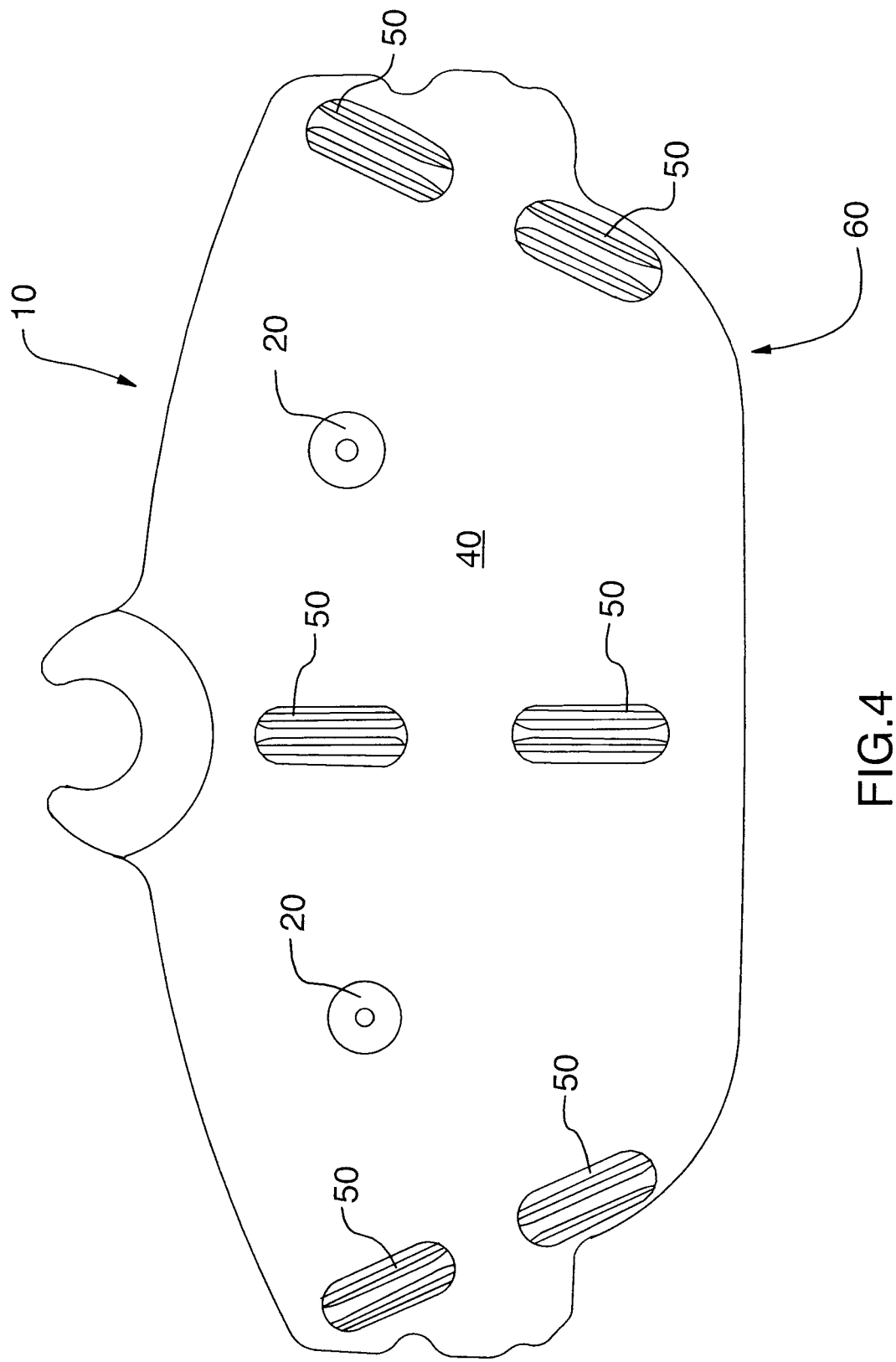
FIG. 4 is a front view of a backing plate according to the present invention.
Figure 14:
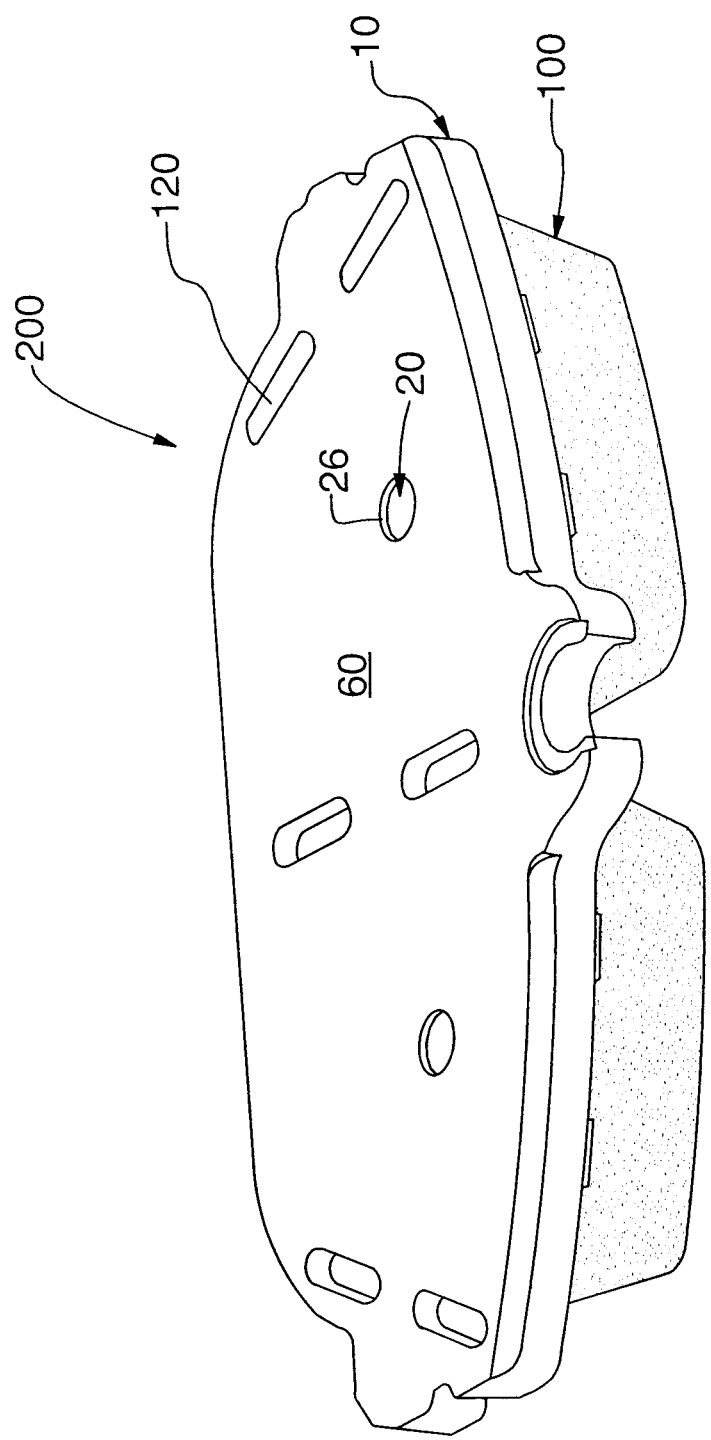
FIG. 14 is a piston side view of the modular brake pad showing locking pins engaged.

A sample backing plate 10 for the modular brake pad is shown in FIG. 4. The plate 10 has friction-40 and piston-facing 60 surfaces. The friction-facing surface 40 is shown in FIG. 4. On this side of the plate, guide rails 50 are disposed (in generally paired arrangements to connect with left and right sides of the replaceable friction elements). The guide rails 50 (which may be integral with the plate or separate hardware) are preferably configured to have a central vertical post portion 54 and one or more (preferably two) overhanging lips 52 that project slightly horizontally from the central post 54 to overhang and thus grip a side edge of the friction element 90 (gripping the shim portion 70 of the friction element 90, if provided). The guide rails, in a preferred embodiment, are punched out from the material of the backing plate (see punch wells 120 on FIGS. 10, 11 and 14), and the punched projections are then shaped by chisel or some other form of press tool) to divide the overhanging lips 52 from the central post 54 and force the lips to curl out (away from the central post).

Figure 6:
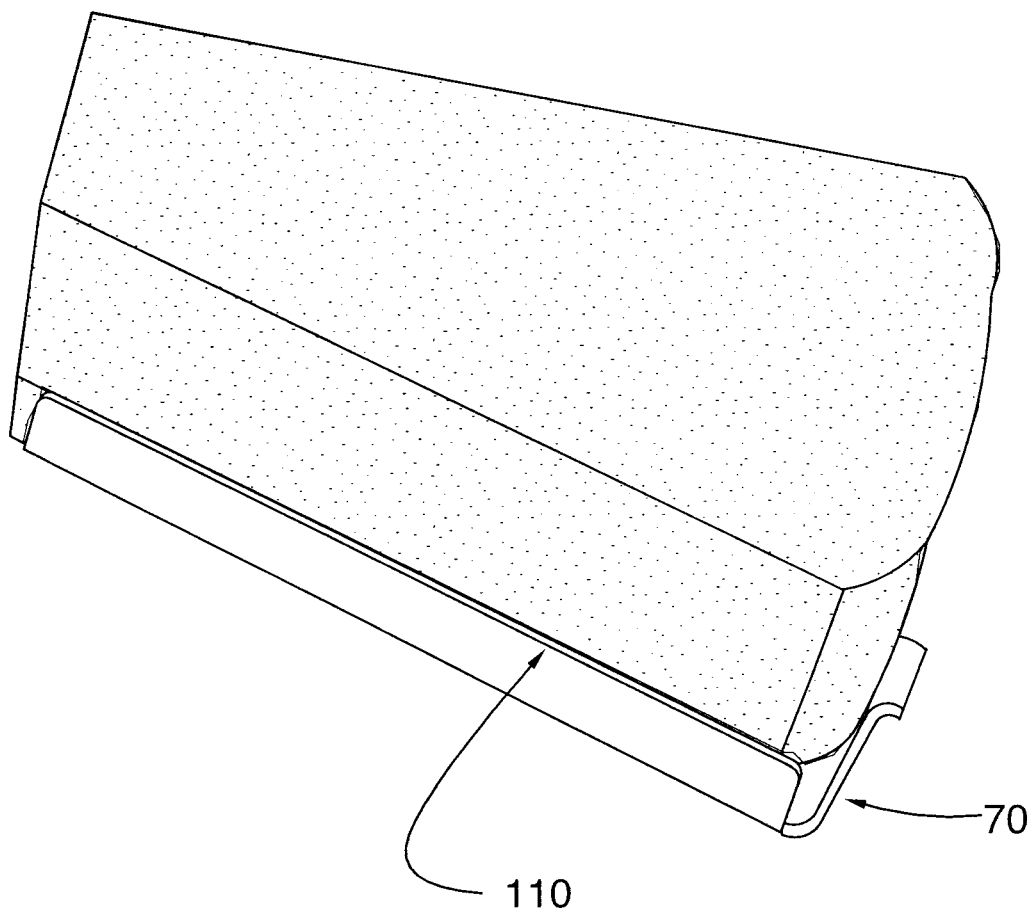
FIG. 6 is a close-up view of a removable friction element showing friction material and shim portions.
Figure 7:
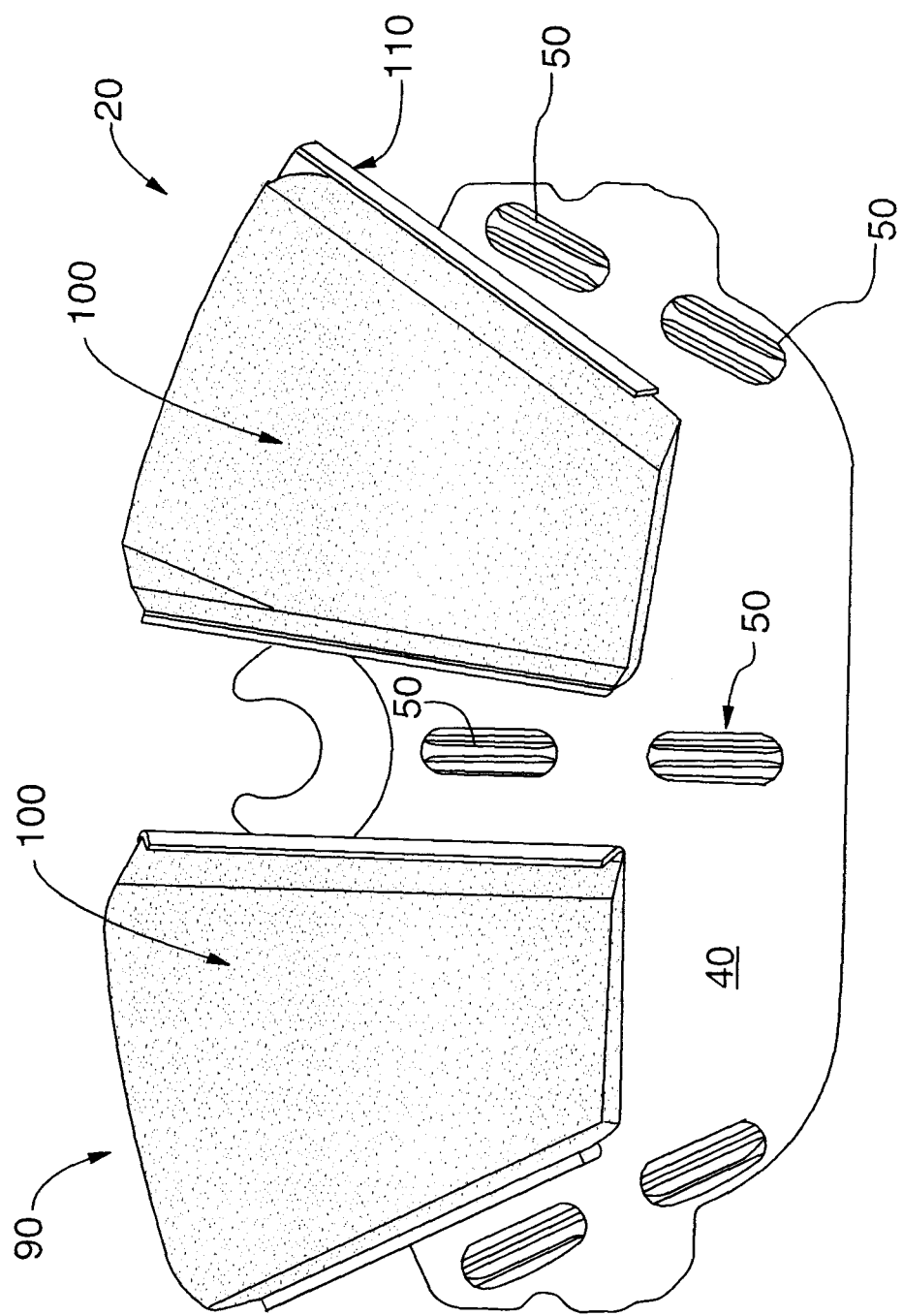
FIG. 7 is a front disassembled view of the modular brake pad showing friction elements which can be slid into the guide rails for attachment to the backing plate.
Figure 8:
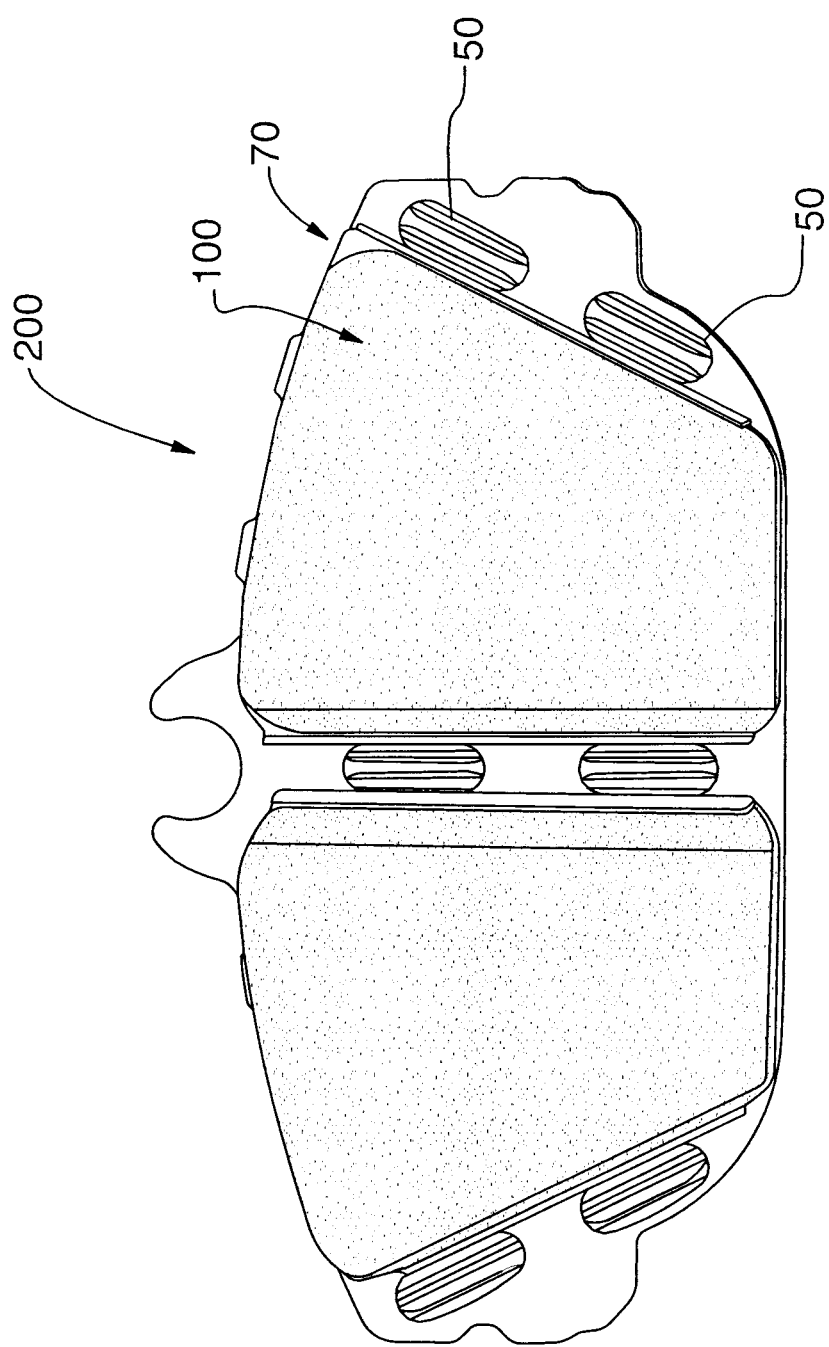
FIG. 8 is a front assembled view of the modular brake pad showing friction elements engaged by the guide rails and attached to the backing plate.
Figure 10:
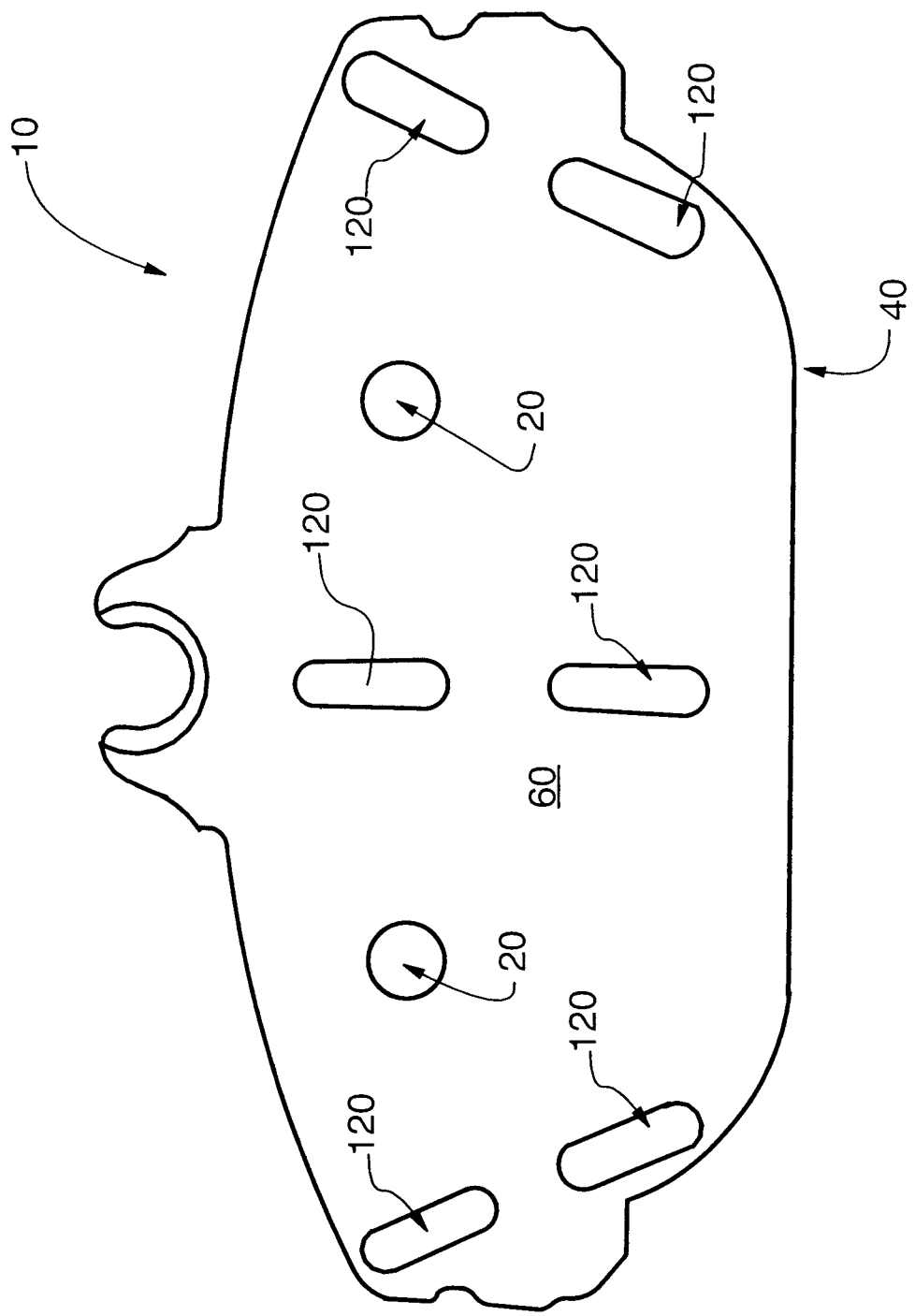
FIG. 10 shows the piston side of the backing plate with locking pins engaged (i.e. locked position).
Figure 11:
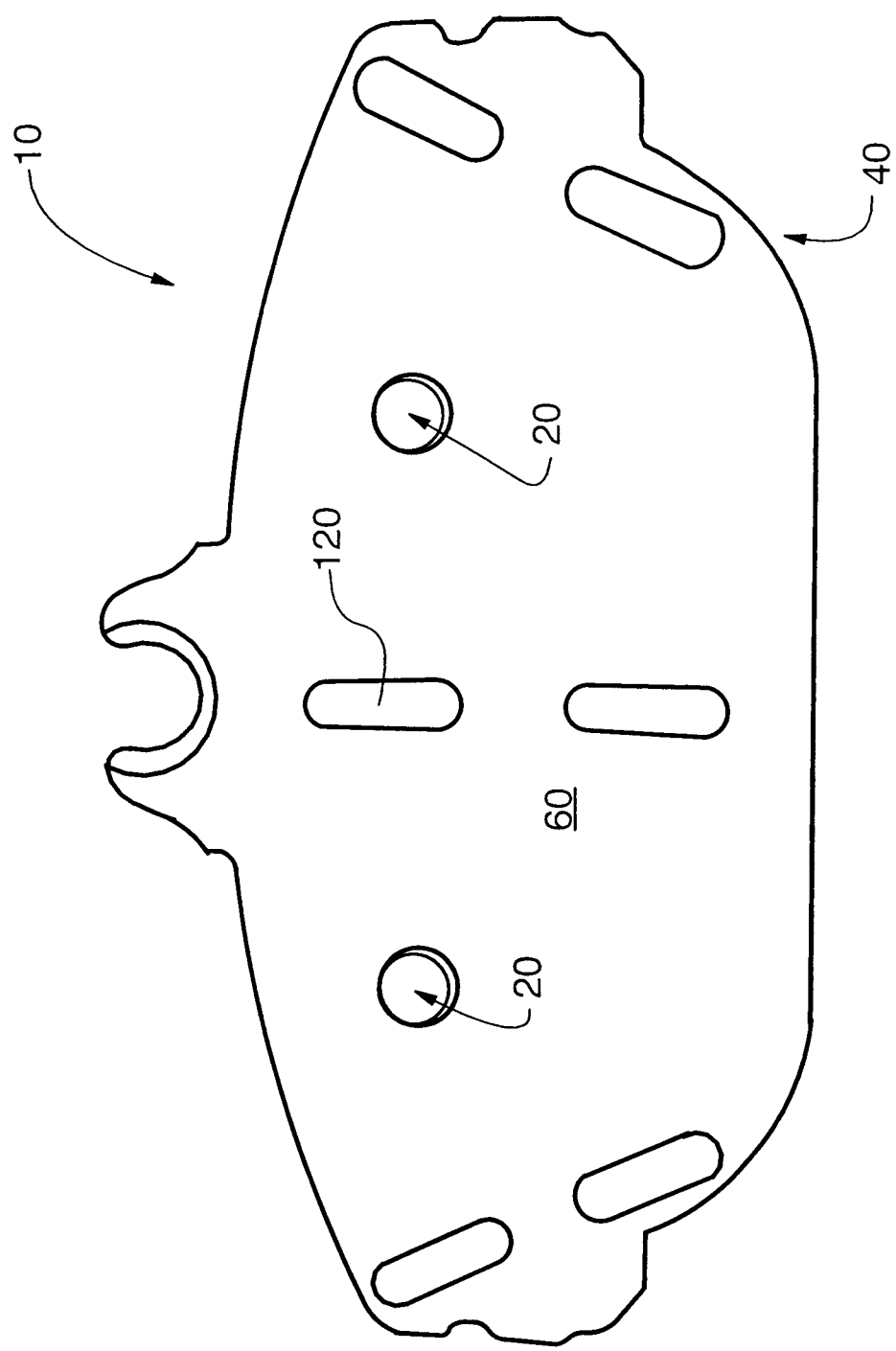
FIG. 11 shows the piston side of the backing plate with locking pins retracted (i.e. unlocked position).

A replaceable friction element 90 is shown in detail in FIG. 6. These friction elements are engageable with the backing plate on its friction side. As shown in FIGS. 7 and 8, the friction elements 90 are connected to the plate by sliding the friction elements into position on the friction side 40 of the plate. Side edges of the friction elements engage with guide rails 50 to prevent side-to-side and rotational shifting on the friction surface 40. To lock the friction elements with the backing plate, optional locking pins 20 may be forced into bores in the plate. The locking pins 20 extend into corresponding bores 120 in the friction elements to lock them to the plate. Locking pins 20 in locked and unlocked position are shown in FIGS. 10 and 11, respectively. Optionally, the modular brake pad may use no locking pins at all. The friction elements 90 are retained by the guide rails 50.

Figure 15:
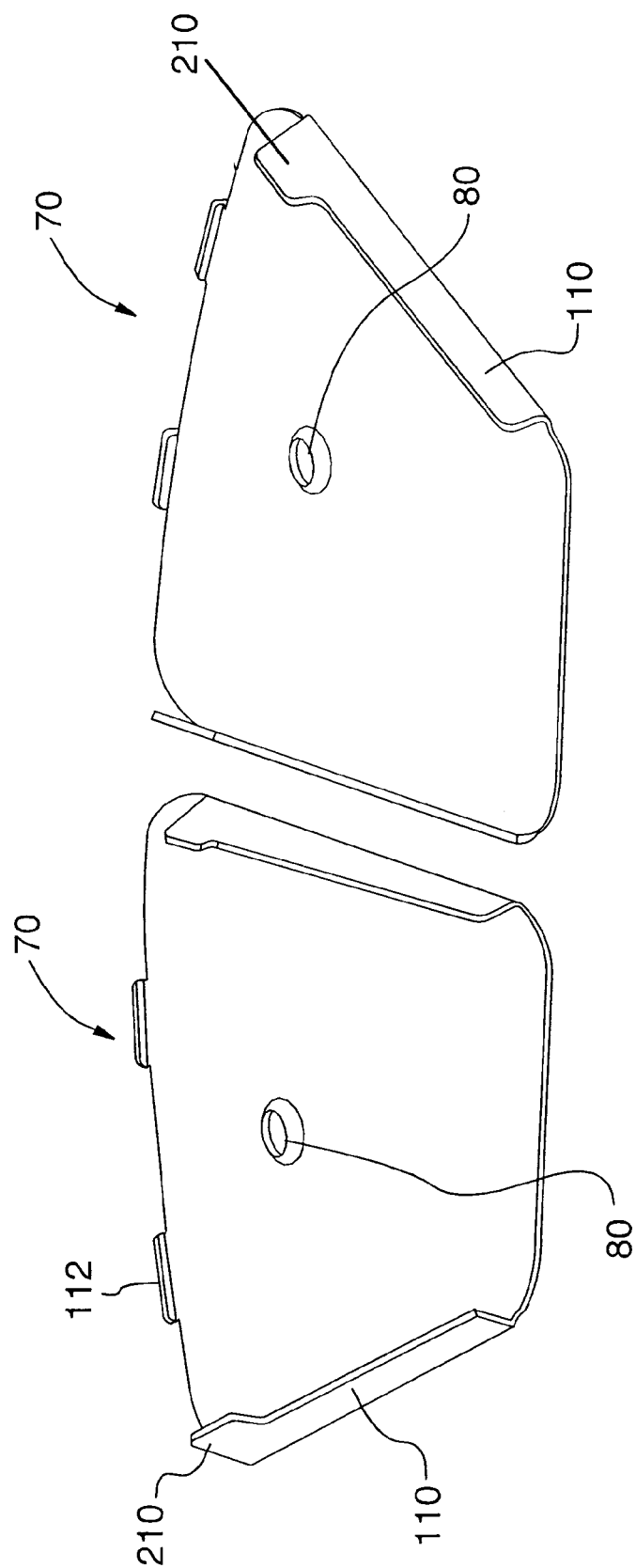
FIG. 15 is a detailed view of one embodiment of the shim portions of the friction elements (disassembled from the friction material portions).
Figure 17:
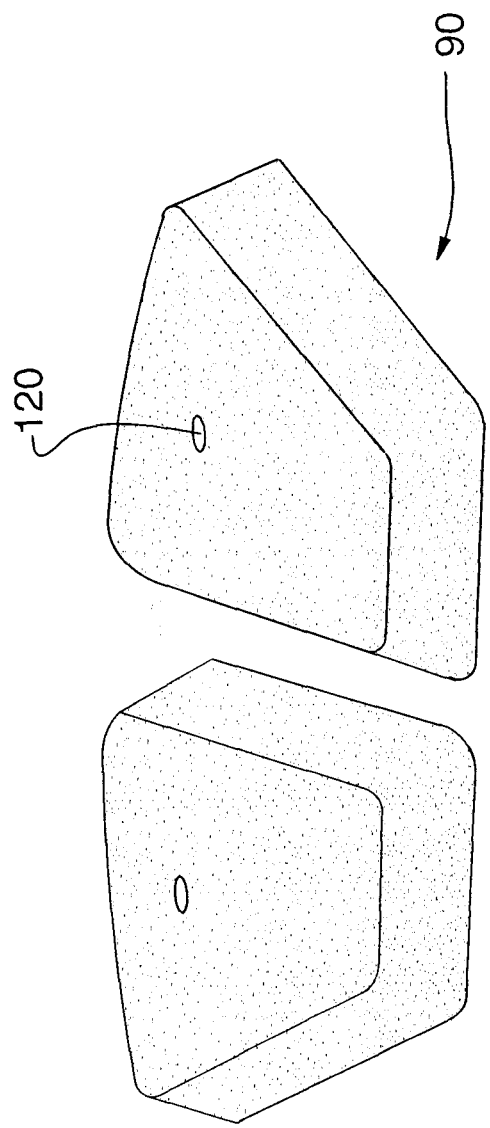
FIG. 17 is a detailed view of one embodiment of the friction material portions of the friction elements (disassembled from the shim portions).

Each friction element 90 may itself be a two-part component. The friction element 90 may have a shim portion 70 and a friction material portion 100. As shown in FIGS. 6 and 17, the composite friction material may be pre-molded into a cake or a puck having tapered edges. A shim portion 70 of thin metal may be wrapped around the molded friction material in permanent or separable (nesting) arrangement. The shim portion preferably extends partway up at least two of the sides of the friction material portion. Side flanges 110 grip and protect the sides and bottom edges of the friction material (to prevent flaking, chipping and breakage of the material, particularly on the relatively thin wedge of the tapered bottom edge). The friction material is more crumbly and breakable than the shim portion 70. The shim 70 may also provide additional noise and vibration reduction in the overall brake pad. In one possible arrangement, the shim portions 70 may have additional gripping fingers or flanges 112 (see FIG. 15) at the top and/or bottom edges to further increase stability and prevent relative rotation between the friction material portion and the shim.

Figure 12:
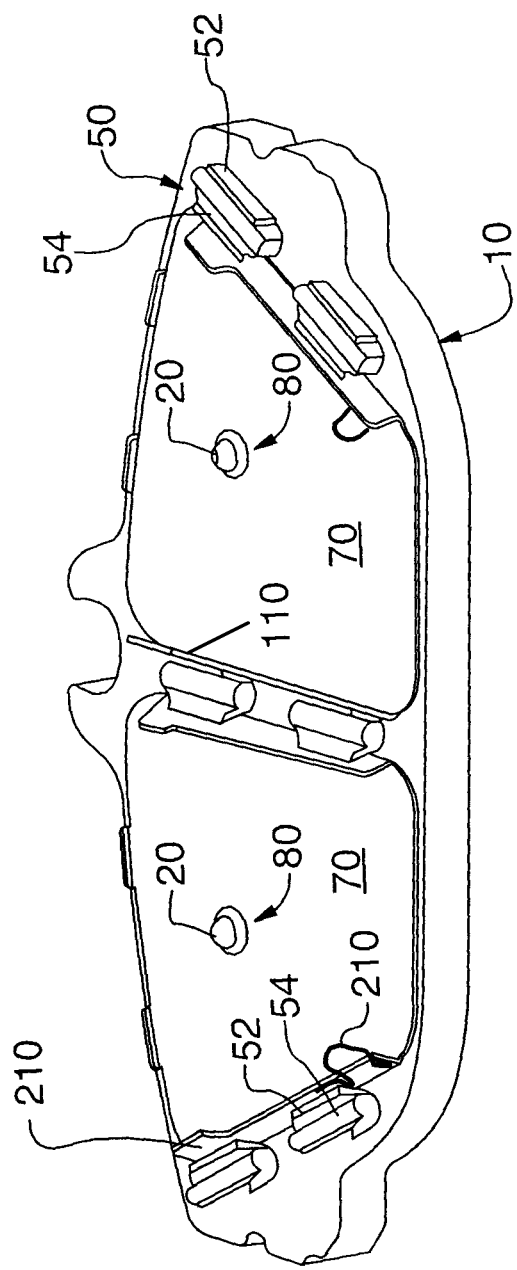
FIG. 12 is a second front view of the backing plate with optional shim portions for the removable friction elements.
Figure 16:
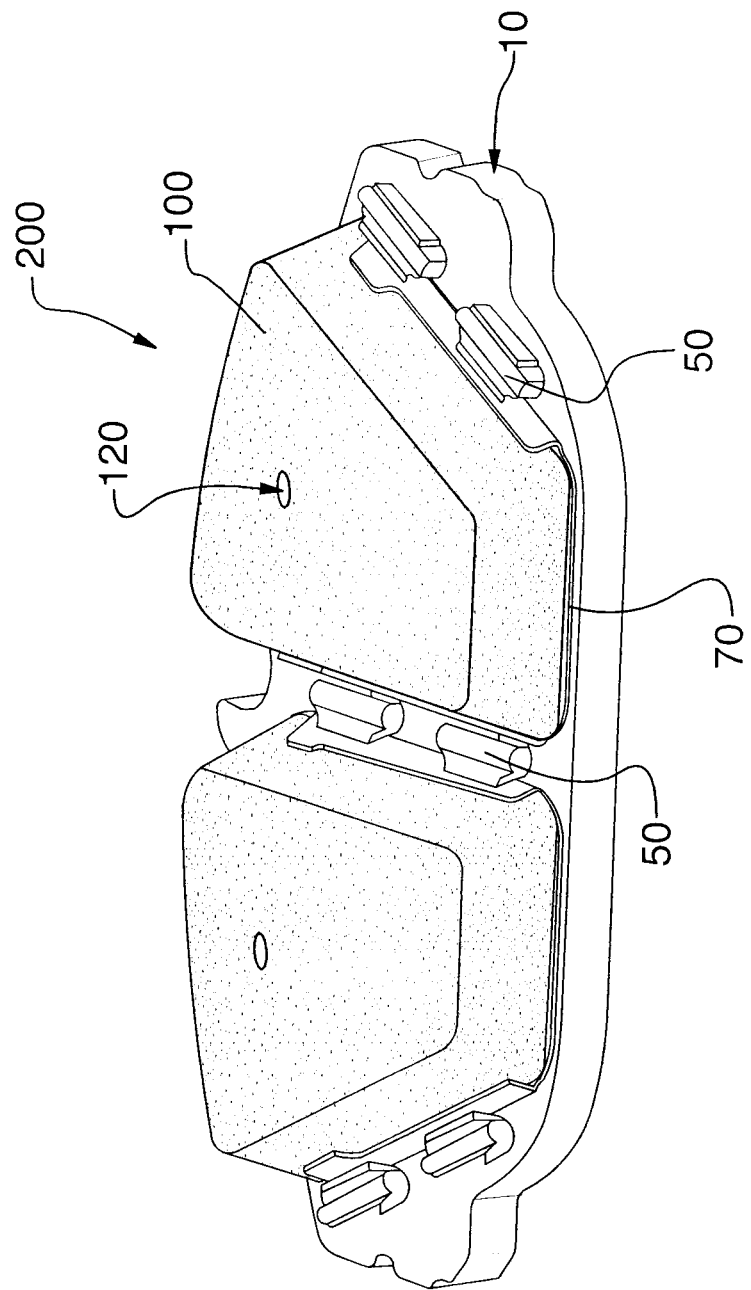
FIG. 16 is a front assembled view of the modular brake pad showing friction elements engaged by the guide rails and attached to the backing plate.

In one possible configuration, as shown in FIGS. 12 and 16, portions of the side flanges 110 of the shim may be configured to extend to a greater degree up the side wall of the friction material portion. In this way, these higher flanged portions 210 can serve as wear sensors for the pad. That is, as the friction material wears down (is consumed) in use of the brake, the portion 210 may become exposed and, by grating against the rotor, produce a sound that will alert the vehicle owner of the need to replace the friction elements on the brake pad.

Figure 13:
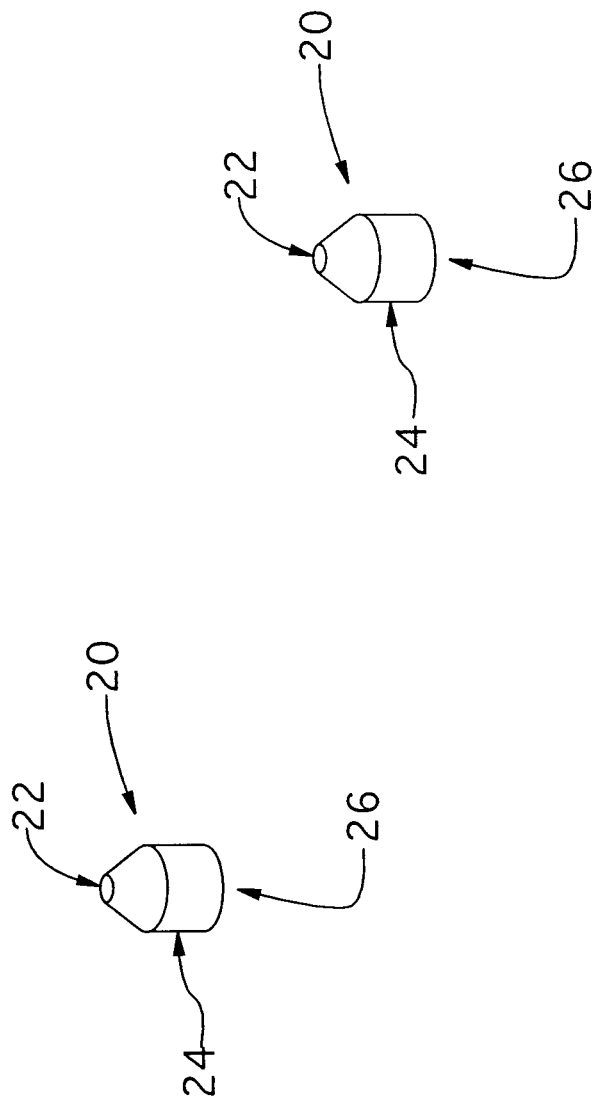
FIG. 13 is a detailed view of one possible configuration of the locking pins.

One possible configuration of the locking pins 20 is shown in FIG. 13. The pins 20 may have a generally cylindrical body 24 with a flat base 26 and a conical (or frusto-conical) top portion 22. The conical shape is to aid in driving the pin into the relatively small diameter bore in the friction elements.

Figure 5:
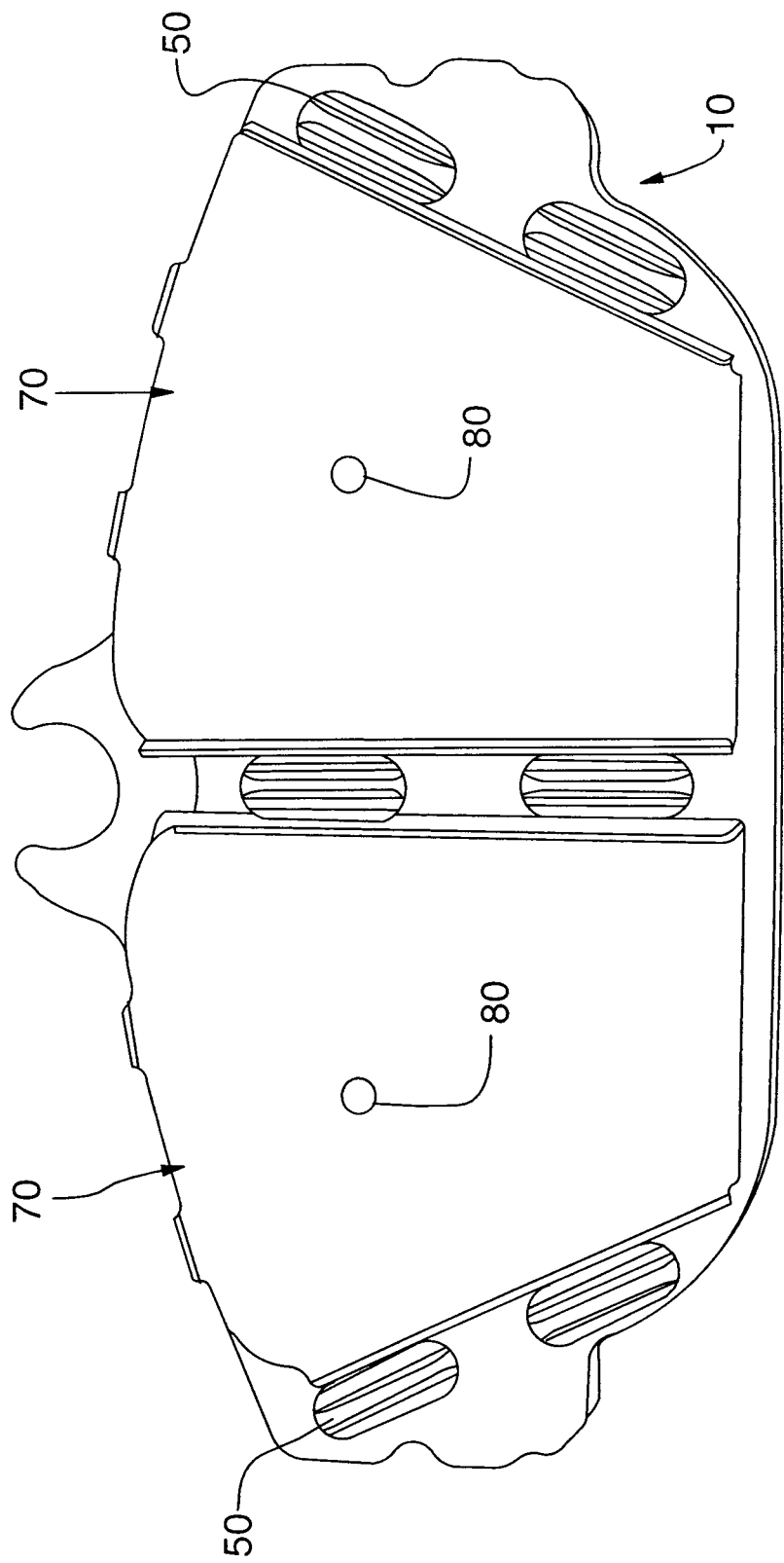
FIG. 5 is a front view of the backing plate with optional shim portions for the removable friction elements.
Figure 9:
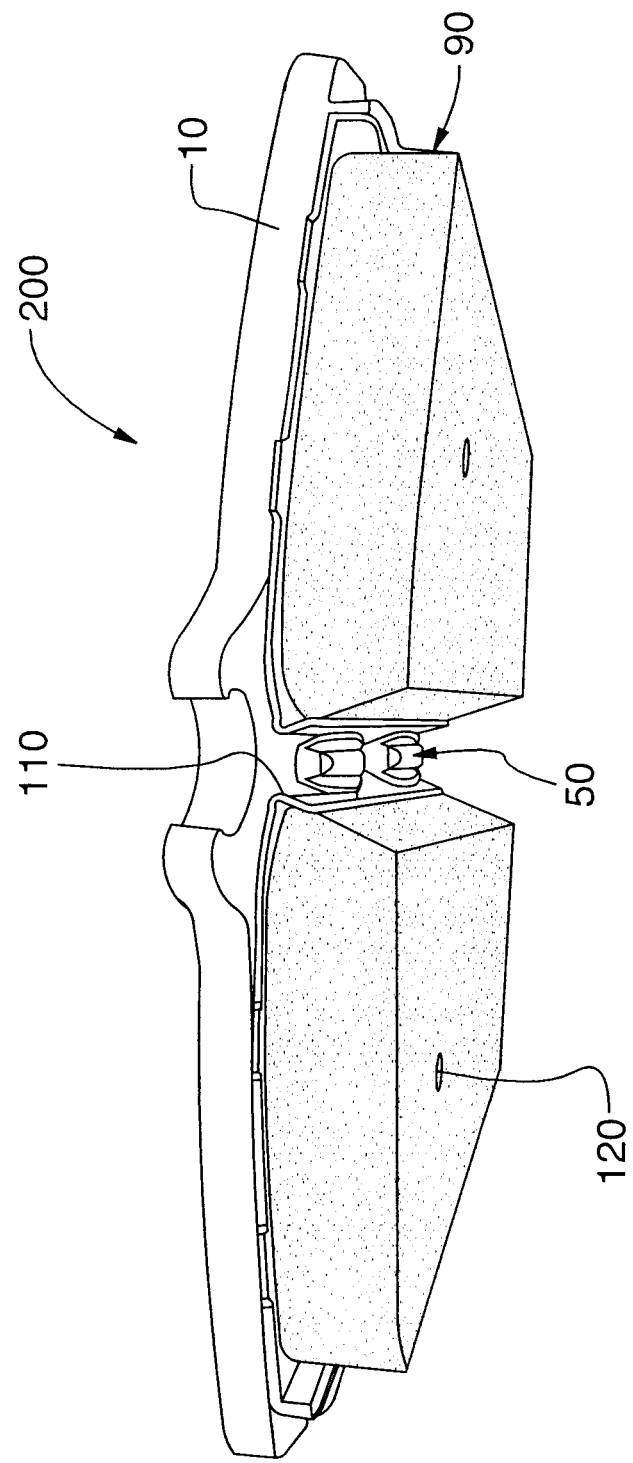
FIG. 9 is a top assembled view of the modular brake pad showing friction elements engaged by the guide rails and attached to the backing plate.

To drive the locking pins 20 into the assembly to hold the plate 10 and friction elements 90 together, the pins 20 are preferably punched, pressed or hammered from the piston-side 60 of the backing plate 10. The point 22 of the locking pin thus passes through the backing plate 10, through the shim portion 70 (via bore 80), and into the friction material portion 100. Preferably, the backing plate, shim portion and friction material portions are all pre-drilled (not necessarily together or at the same time) to have aligning bores to make a continuous channel through the assembly. The alignment of plate and shim bores is shown in FIGS. 5 and 12. As shown in FIG. 9, the friction material portion also has a bore 120 that can be accessed from the front (i.e. rotor-facing) surface of the friction material. This bore 120 is a smaller diameter bore than the bores in the plate and shim portion. Thus, the pin 20 has a frictional (or press-fit) engagement with the friction material inside the snug bore 120. Alternatively, no locking pins may be used and the plate and friction elements are solid with no bores whatsoever.

The pin 20 can be forced out of the bore 120 (and, in turn, out of the shim and backing plate) by poking a slender tool (not shown) into the bore 120 from the friction side and applying a sharp downward force to the tool to disengage the pin (for unlocking). The pin may be made to be re-used with a fresh friction element, or a new locking pin may be inserted.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

The invention claimed is:

1. A modular brake pad, comprising:
    a brake backing plate having a friction surface and an opposing piston surface;
    the plate having at least one pair of raised guide rails on the friction surface; and
    at least one pre-molded friction element having a shim portion comprising metal and having a friction material portion, each portion having a pair of opposing side edges, the edges being tapered for releasable connection of the shim portion with the at least one pair of raised guide rails;
    wherein the friction element is removable from the plate by slideably disengaging the friction element from the guide rails;
    wherein the guide rails are integral with the plate;
    and wherein the shim portion is shaped to wrap around the friction material portion extending partway up the sides of the friction material portion.

2. The modular brake pad of claim 1, wherein the opposing side edges of the friction element are not parallel to each other.

3. The modular brake pad of claim 1, wherein the friction element has a trapezoidal shape.

4. The modular brake pad of claim 1, wherein the opposing side edges of the friction element are at an angle to each other.

5. The modular brake pad of claim 1, wherein the shim portion is thin metal, and the shim portion and friction material portion are separable from each other.

6. The modular brake pad of claim 1, wherein the shim portion and friction material portion are permanently connected to each other.

7. The modular brake pad of claim 1, wherein upwardly extending side flanges on the shim portion serve as wear sensors.

8. The modular brake pad of claim 1, having exactly two friction elements.

9. The modular brake pad of claim 8, having exactly three guide rails, including a central guide rail that holds both friction elements, and two outer guide rails that each grip a side edge of one of the friction elements.

10. The modular brake pad of claim 8, wherein the two friction elements are different shapes.

11. The modular brake pad of claim 8, wherein the two friction elements are right and left friction elements.

12. The modular brake pad of claim 8, wherein the two friction elements are mirror image shapes of each other.

13. The modular brake pad of claim 1, wherein the at least one friction element is disengageable from the plate by sliding the friction element to disengage the side edges from the guide rails.

14. The modular brake pad of claim 1, wherein each guide rail comprises a central post extending out from the plate and at least one overhanging lip extending out from the central post.

15. The modular brake pad of claim 1, wherein the guide rails are punched out from the plate.

16. The modular brake pad of claim 1, wherein the backing plate is a steel backing plate.

17. The modular brake pad of claim 1, wherein the piston surface of the plate is substantially flat.

18. The modular brake pad of claim 1, wherein the plate is substantially solid and has no holes.

19. A modular brake pad, comprising:
    a brake backing plate having a friction surface and an opposing piston surface;
    the plate having at least one pair of raised guide rails on the friction surface;
    at least one pre-molded friction element having a shim portion and a friction material portion, each portion having a pair of opposing side edges, the edges being tapered for releasable connection of the shim portion with the at least one pair of raised guide rails; and
    at least one locking pin extending through corresponding bores in the plate and the shim portion and into a corresponding bore in the friction material portion for releasably locking the friction element to the plate;

wherein the friction element is removable from the plate by retracting the locking pin and disengaging the friction element from the guide rails;

and wherein the guide rails are integral with the plate.

20. The modular brake pad of claim 19, wherein the locking pin has a conically shaped end for engaging the friction element.

21. The modular brake pad of claim 19, wherein the locking pin can be retracted by forcing a tool into the bore of the friction material portion to push the locking pin out through the piston surface of the plate.

22. The modular brake pad of claim 19, wherein the locking pin is re-usable after retraction.

23. The modular brake pad of claim 19, wherein the backing plate is a steel backing plate.

24. The modular brake pad of claim 19, wherein the piston surface of the plate is substantially flat when the locking pin is in place.

25. The modular brake pad of claim 19, wherein the backing plate has no holes apart from the bore for the locking pin.

26. A modular brake pad, comprising:

a brake backing plate having a friction surface and an opposing piston surface;

the plate having at least one pair of raised guide rails on the friction surface;

at least one pre-molded friction element having a shim portion comprising metal and having a friction material portion, each portion having a pair of opposing side edges, the edges being tapered for releasable connection of the shim portion with the at least one pair of raised guide rails; and locking hardware releasably attached to the friction surface for locking the friction element to the plate;

wherein the friction element is removable from the plate by slideably disengaging the friction element from the guide rails;

and wherein the guide rails are integral with the plate.

* * * * *

UNITED STATES PATENT AND TRADEMARK OFFICE
CERTIFICATE OF CORRECTION

PATENT NO. : 8,752,679 B2  
APPLICATION NO. : 13/139264  
DATED : June 17, 2014  
INVENTOR(S) : Arbesman et al.

Page 1 of 1

It is certified that error appears in the above-identified patent and that said Letters Patent is hereby corrected as shown below:

Title Page, Inventors (76):

Please delete "Kahn" and insert --Kahan-- therefor.

Signed and Sealed this  
Twenty-third Day of December, 2014

Michelle K. Lee  
*Deputy Director of the United States Patent and Trademark Office*